United States Patent
Goto et al.

(10) Patent No.: US 8,410,697 B2
(45) Date of Patent: Apr. 2, 2013

(54) LIGHT SOURCE DEVICE

(75) Inventors: Kazuhiro Goto, Himeji (JP); Akihiko Sugitani, Himeji (JP); Shoichi Terada, Himeji (JP); Takahiro Toma, Himeji (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 677 days.

(21) Appl. No.: 11/610,157

(22) Filed: Dec. 13, 2006

(65) Prior Publication Data
US 2007/0132403 A1    Jun. 14, 2007

(30) Foreign Application Priority Data
Dec. 13, 2005 (JP) ................ 2005-358476

(51) Int. Cl.
*H01J 17/04* (2012.01)
*H01J 61/04* (2006.01)
*H01J 1/00* (2006.01)
*H01K 1/02* (2006.01)

(52) U.S. Cl. ....................... 313/631; 313/326
(58) Field of Classification Search ........... 313/627–643
See application file for complete search history.

(56) References Cited

U.S. PATENT DOCUMENTS

| | | | |
|---|---|---|---|
| 6,002,197 A * | 12/1999 | Tanaka et al. ........... | 313/113 |
| 6,545,430 B2 | 4/2003 | Ono et al. | |
| 6,552,499 B2 | 4/2003 | Derra et al. | |
| 6,597,115 B2 | 7/2003 | Goto et al. | |
| 2002/0117968 A1* | 8/2002 | Derra et al. ........... | 315/56 |
| 2004/0165155 A1 | 8/2004 | Lee et al. | |
| 2004/0189205 A1* | 9/2004 | Nishida ................ | 313/631 |
| 2006/0039153 A1* | 2/2006 | Gupta ................ | 362/298 |

FOREIGN PATENT DOCUMENTS

| | | |
|---|---|---|
| EP | 0 910 111 A2 | 4/1999 |
| EP | 1 353 357 A2 | 10/2003 |
| EP | 1 458 010 A2 | 9/2004 |
| EP | 1 548 796 A1 | 6/2005 |

* cited by examiner

*Primary Examiner* — Karabi Guharay
*Assistant Examiner* — Zachary J Snyder
(74) *Attorney, Agent, or Firm* — Roberts Mlotkowski Safran & Cole, P.C.; David S. Safran

(57) ABSTRACT

A light source device which can also advantageously control the growth of the projection using the DMD type is achieved in a light source device which has an ultrahigh pressure discharge lamp) in which the silica glass discharge vessel is filled with greater than or equal to 0.15 mg/mm$^3$ mercury and bromine; a feed device; an oval reflector; and a color wheel by the electrode on the side of the opening of the oval reflector of the discharge lamp having an increased diameter, and the relation $0.06 < W/I^2 < 0.96$ between the volume W (mm$^3$) of the tip area with increased diameter and the current value I being satisfied.

1 Claim, 4 Drawing Sheets

| | $W/I^2$ | Probability of existence of a projection (%) | Visual confirmation of the fluctuation of the illuminance | Positional stability of the projection over time |
|---|---|---|---|---|
| Lamp 1 | | — | × | — |
| Lamp 2 | 0.04 | 65 | △ | △ |
| Lamp 3 | 0.06 | 80 | ○ | ○ |
| Lamp 4 | 0.08 | 87 | ○ | ○ |
| Lamp 5 | 0.1 | 90 | ◎ | ◎ |
| Lamp 6 | 0.12 | 100 | ◎ | ◎ |
| Lamp 7 | 0.14 | 100 | ◎ | ◎ |
| Lamp 8 | 0.16 | 100 | ◎ | ◎ |
| Lamp 9 | 0.18 | 100 | ◎ | ◎ |
| Lamp 10 | 0.2 | 100 | ◎ | ◎ |
| Lamp 11 | 0.3 | 100 | ◎ | ◎ |
| Lamp 12 | 0.4 | 100 | ◎ | ◎ |
| Lamp 13 | 0.5 | 100 | ◎ | ◎ |
| Lamp 14 | 0.6 | 100 | ◎ | ◎ |
| Lamp 15 | 0.7 | 100 | ◎ | ◎ |
| Lamp 16 | 0.8 | 100 | ○ | ○ |
| Lamp 17 | 0.9 | 100 | ○ | ○ |
| Lamp 18 | 0.96 | 100 | ○ | ○ |
| Lamp 19 | 1 | 100 | △ | × |
| Lamp 20 | 1.04 | 100 | × | × |

Fig. 5

LIGHT SOURCE DEVICE

BACKGROUND OF THE INVENTION

1. Field of the Invention

The invention relates to a light source device. The invention relates especially to a light source device which is suited for a projector device using a DLP (digital light processor).

2. Description of Related Art

In a projector device using liquid crystals and DMD (digital micro mirror device), light radiated from a light source (discharge lamp) is focused using a reflector, a lens system and the like onto small elements for display of video information, and thus, they are illuminated. Furthermore, in this connection, the light transmitted or reflected by these small elements is radiated by an optical system, such as lenses or the like, onto a screen. In this connection, it is required that the discharge lamp is a point light source because the small elements are at most 1 inch, and moreover, because for smaller angular components of the incident light flux, the degree of utilization of light is high and the image contrast is improved.

For color projection of video information, there are a single leaf type and a triple leaf type. In the triple leaf type, after separation of the light radiated by the light source into three colors (Red)G(reen)B(lue), the light corresponding to the video information is transmitted or reflected by the respective display element, and afterwards, the three colors transmitted by the respective display element are combined and projected onto the screen.

On the other hand, for the single leaf type, the light radiated from the light source is radiated via a color wheel in which RGB regions are formed by division, reflected onto the DMD with which certain light is reflected, and radiated onto the screen. For the DMD, a few million small mirrors per pixel are located next to one another, the light projection being controlled by controlling the direction of the individual small mirrors.

In the case of the DMD type, a color image with R, G or B is projected on the screen in an extremely short time, due to this extremely short time, for the human eye, only composite color images are seen. In this DMD type, compared to the liquid crystal type, there is the advantage of a reduction in the size of the entire device, and its simplification, since the optical system is simple and three liquid crystal cells need not be used.

On the other hand, the light source of a projector device is a high pressure discharge lamp with high mercury vapor pressure since, by increasing the mercury vapor pressure, light in the visible wavelength range can be obtained with high efficiency. It is known that, in such a discharge lamp with a high mercury vapor pressure during operation, a projection is formed on the electrode tip. For example, Japanese patent application publication JP-A 2001-312997 and corresponding U.S. Pat. No. 6,545,430 disclose a technique in which the phenomenon of arc jump is effectively suppressed by stable focusing of the position of formation of the discharge arc on the projection. In this connection, it is specifically described that the growth of the projection is suppressed by given amounts of halogen and mercury, the given distance between the electrodes, the given operating frequency and the like.

In the case of a projector device of the DMD type, however, even in operation under the conditions under which the projection should be advantageously controlled, there arose the disadvantage of the arc becoming unstable as a result of the disappearance of this projection. This disadvantage occurs especially for an electrode on the side of the front opening of the oval reflector. It can be imagined that the reason for this is that the radiant light of the lamp is reflected by the color wheel and is emitted onto the electrode, by which this electrode is heated to an unexpectedly high temperature. In particular, since the color wheel is located more forward (lamp side) than the focal position of the oval reflector, the electrode is heated on the front opening side of the reflector.

SUMMARY OF THE INVENTION

A primary object of the present invention is to devise a light source device which can advantageously control the growth of the projection using the type of DMD.

In accordance with the invention, for a light source device which comprises:

an ultrahigh pressure discharge lamp in which the silica glass discharge vessel contains a pair of electrodes with a distance of less than or equal to 1.5 mm opposite, and which is filled with greater than or equal to 0.15 mg/mm$^3$ mercury and bromine in the range from $10^{-6}$ μmol/mm$^3$ to $10^{-2}$ μmol/mm$^3$;

a feed device which supplies an alternating current to the discharge lamp and operates it;

an oval reflector which is located such that its optical axis coincides with the direction of the electrode axis of this discharge lamp and which reflects the radiant light of the discharge lamp; and a color wheel which, proceeding from the focal position of the oval reflector, is located at the position nearer the lamp and which receives the light from the reflector and divides it into color components, the above described object is achieved in that the electrodes each have a tip area with an increased diameter and a projection which is formed in the tip area with an increased diameter, and that, in the one of these electrodes which is located on the side of the opening of the oval reflector, the relation between the volume W (mm$^3$) of the tip area with increased diameter and the current value I (A) which is supplied from the above described feed device is $0.06 < W/I^2 < 0.96$.

The object is furthermore achieved in accordance with the invention in that the volume of the electrode tip area with an increased diameter on the side of the reflector facing away from the opening is smaller than that of the electrode on the opening side of the reflector.

Action of the Invention

In accordance with the invention, the electrode on the side of the front opening of the reflector is designed with consideration of irradiation with the light reflected from the color wheel. In the case of using this discharge lamp for DMD for which a color wheel is needed, therefore disappearance of the projection by overheating is avoided.

The invention is further described below with reference to the accompanying drawings.

BRIEF DESCRIPTION OF THE DRAWINGS

FIG. 5 is a chart of test results which shows the action of the invention.

DETAILED DESCRIPTION OF THE INVENTION

Figure 1:
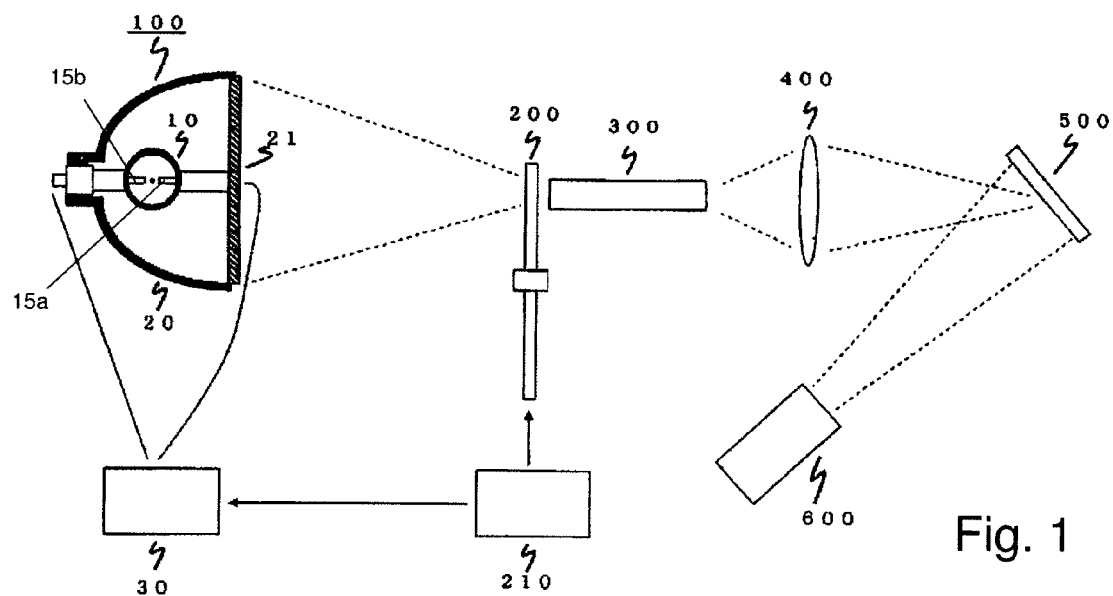
FIG. 1 is a schematic representation of the arrangement of a light source device in accordance with the invention.

FIG. 1 schematically shows the arrangement of a light source device in accordance with the invention. A lamp unit 100 consists of a discharge lamp 10 and a concave, oval reflector 20. In front of the lamp unit 100 a color wheel 200, a rod integrator lens 300, a lens 400, a DMD 500 and a lens 600 are arranged in series.

The discharge lamp 10 is installed in the oval reflector 20. The two are arranged such that the direction (lengthwise direction) in which the electrodes of the discharge lamp 10 run agrees with the direction of the optical axis of the oval reflector and the arc radiating spot of the discharge lamp essentially agrees with the first focal point of the oval reflector 20. The light reflected from the oval reflector 20 is incident via the color wheel 200 in the rod integrator axis 300, the color wheel 200 being somewhat closer to the lamp than to the second focal point of the oval reflector 20. For the color wheel 200, driving controls such as rotation, stop and the like are implemented using the filter driving device 210. Feed control is done using a feed device 30 for the discharge lamp 10.

The color wheel is also called a rotary filter and is made of disk-shaped glass. In the filter, a red region (R), a green region (G), a blue region (B) and a white region (W) are each formed to be sector-shaped.

The reflection light from the lamp unit 100 is transmitted by the light focusing region which is formed on the color wheel 200. By rotating the color wheel 200, the colors corresponding to the light focusing region are supplied in succession to the rear lens, by which red (R), green (G) and blue (B) are projected in a time-divided manner. Per unit of time, only one of the colors is projected via the image display element. However, for the human eye, these colors or the color mixture thereof are recognized as an image. White (W) is used to brighten the image overall. The entire picture can be brightened by projection of white per certain unit of time. In this connection, the color wheel 200 is rotated, for example, at 180 Hz (180 rpm), so that red, green, blue and white are projected 180 times per second.

The respective region area of the color wheel 200 is fixed with consideration of the color balance and the brightness of the final image. The color wheel 200 has a radius, for example, of 25 mm. The light focusing region is formed, for example, in a right-angle shape of 3.6×4.8 mm.

Figure 2:
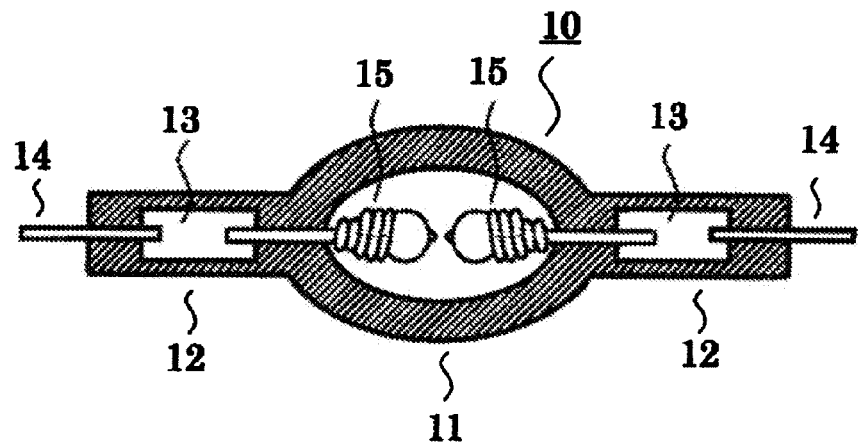
FIG. 2 is a schematic cross-sectional view of the discharge lamp in accordance with the invention.

FIG. 2 shows the overall arrangement of a high pressure discharge lamp which is used in the light source device in accordance with the invention. The discharge lamp 10 has an essentially spherical light emitting part 11 which is formed by a silica glass discharge vessel. On the two ends of the light emitting part 11, hermetically sealed portions 12 are formed into each of which a conductive molybdenum metal foil 13 is hermetically sealed by a pinch seal. An axis of one electrode 15 is connected to one end of the metal foil 13. An outer lead 14 is connected to the other end of the metal foil 13, by which electrical power is supply from an external feed device 30. In this light emitting part 11, there are a pair of opposed electrodes 15 that are separated by a distance of at most 2 mm. An arc radiance spot is formed between the electrodes.

The light emitting part 11 is filled with mercury, rare gas and halogen gas. The mercury is used to obtain the required axial length of visible radiation, for example, to obtain radiant light with 360 nm to 780 nm, and is filled with 0.2 mg/mm$^3$ of mercury. This fill amount differs depending on the temperature conditions. However, in operation with at least 200 atm, an extremely high vapor pressure is reached. By adding a larger amount of mercury, a discharge lamp with a still higher mercury pressure in operation of at least 250 atm or at least 300 atm can be produced. The higher the mercury vapor pressure, the more suitable the light source for the projector device which can be built.

As the rare gas, for example, roughly 13 kPa of argon gas are added to improve ignitability. The halogen can be iodine, bromine, chlorine and the like in the form of a compound with mercury or other metals. The amount of halogen added is selected to be in the range of from $10^{-6}$ μmol/mm$^3$ to $10^{-2}$ μmol/mm$^3$. Its function is to prolong the service life using the so-called halogen cycle. For an extremely small discharge lamp with an extremely high operating vapor pressure, like the discharge lamp in accordance with the invention, it is also to prevent devitrification of the discharge vessel.

The numerical values of the discharge lamp are described below by way of example.

For example:

the maximum outside diameter of the light emitting part is 9.5 mm;

the distance between the electrodes is 1.5 mm;

the inside volume of the arc tube is 75 mm$^3$;

the rated voltage is 70 V and the rated wattage is 200 W.

The discharge lamp is operated using an alternating current.

This discharge lamp is installed in a projector device of the DLP type which should be as small as possible. On the one hand, there is a demand for reducing the overall dimensions as much as possible while, on the other hand, a large amount of emission light is required. Therefore, the thermal effect in the light emitting part is extremely serious. The value of the wall load of the lamp is 0.8 W/mm$^2$ to 2.0 W/mm$^2$, specifically 1.5 W/mm$^2$.

That the lamp has such a high mercury vapor pressure and such a high value of the wall load leads to it being able to offer radiant light with good color reproduction when it is installed in a presentation apparatus, such as a projector device of the DLP type.

The oval reflector 20 is oval collector optics of the short focal point type. A multilayer film of titanium oxide, silicon oxide or the like is vapor deposited thereon, the substrate formed of borosilicate glass or crystallized glass. As was described above, the arc radiance spot of the discharge lamp 10 is located on one of the focal positions of the oval reflectors 2, while the other focal position is located somewhat behind the color wheel (to the rear in the direction of linear propagation of light). There is also the case in which the front opening of the oval reflector 20 is provided with a front glass 21.

On the tip of the electrode 15 (on the end which is opposite the other electrode), in the course of lamp operation, a projection is formed. The phenomenon of forming the projection is not entirely clear, but the following can be assumed.

The tungsten (electrode material) vaporized from the high temperature region in the vicinity of the electrode tip during lamp operation reacts with the halogen and residual oxygen which are present in the arc tube. When the halogen is, for example, Br, it is present as a tungsten compound, such as WBr, WBr$_2$, WO, WO$_2$, WO$_2$Br, WO$_2$Br$_2$ or the like. These compounds decompose in the high temperature region in the gaseous phase in the vicinity of the electrode tip and yield tungsten atoms or cations. Due to temperature scattering (diffusion of tungsten atoms from the high temperature region (=arc center) in the gaseous phase in the direction toward the low temperature region (=vicinity of the electrode tip)) and due to the fact that tungsten atoms are ionized in the arc, cations form and drift during cathode operation through the electrical field in the direction to the cathode, and the tungsten vapor density in the gaseous phase in the vicinity of the electrode tip becomes high, by which precipitation occurs on the electrode tip and by which projections are formed here.

Even if there is no projection at the start, in the course of subsequent operation, it forms naturally, so to speak. However, it does not form in all discharge lamps. It is known that in a discharge lamp of the short arc type with a distance between the electrodes of at most 2 mm, for which the light emitting part contains at least 0.15 mg/mm$^3$ of mercury, rare gas and halogen in the range from $1 \times 10^{-6}$ to $1 \times 10^{-2}$ μmol/mm$^3$, a projection is formed in the course of lamp operation.

In the case of using the lamp as the light source of a projector device with a distance between the electrodes of at most 2 mm, for which the arc tube contains at least 0.15 mg/mm$^3$ of mercury (especially at least 0.2 mg/mm$^3$) as in the discharge lamp in accordance with the invention, this projection is essential. This is because, for a discharge lamp with an arc tube containing at least 0.15 mg/mm$^3$ (especially at least 0.2 mg/mm$^3$) of mercury, and in which the operating pressure reaches at least 200 atm, the arc discharge is pinched small by a high vapor pressure and that, as a result, the discharge start point is likewise pinched small.

For a spherical electrode, in which the projection disappears, therefore, the discharge start point moves in tiny steps; this leads to the disadvantage of flicker on the screen of the projector device because especially for an arc radiance spot which is formed with a small distance between the electrodes of at most 2 mm, even a small movement of at most 0.5 mm can lead to flickering which destroys image on the screen.

Figure 3A:
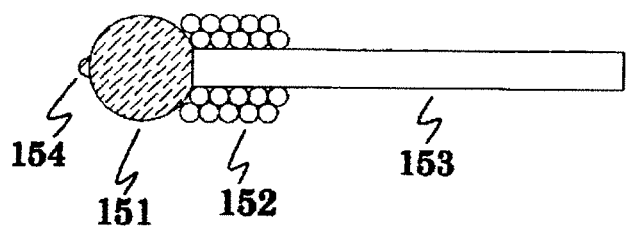
FIGS. 3(a) to 3(d) each show an electrode of the discharge lamp in accordance with the invention.
Figure 3B:
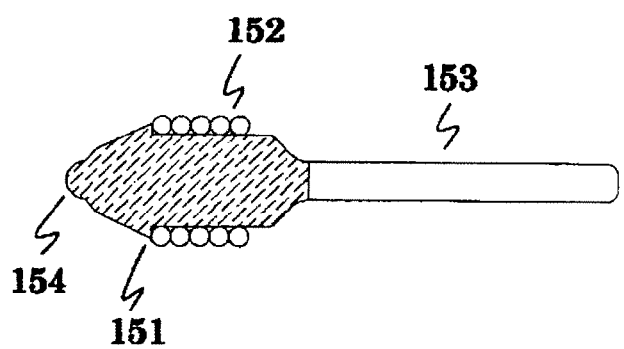
Figure 3C:
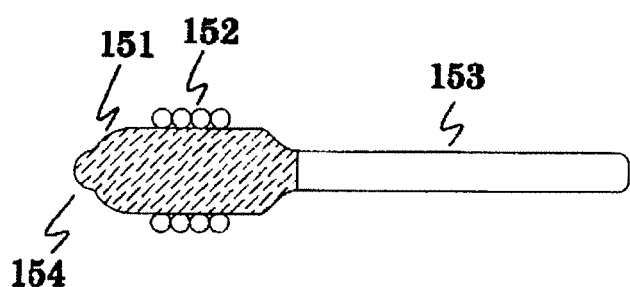
Figure 3D:
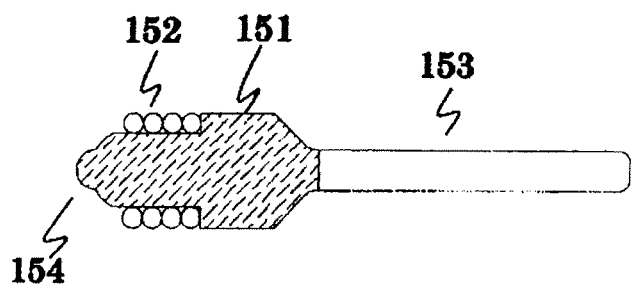

FIGS. 3(a) to 3(d) each show a projection which has been formed in the electrode and on the tip. FIG. 3(a) shows an electrode (so-called melting electrode) which was produced by melting coil-like tungsten. FIGS. 3(b), 3(c) and 3(d) each show an electrode (so-called cut electrode) which was produced by cutting to length.

In FIG. 3(a), the electrode 15 as a whole is formed of a tip area 151 with an enlarged diameter, a coil part 152 and a support rod 153. On the tip of the tip area 151 (on the side opposite the other electrode), a projection 154 with an increased diameter is formed. The coil part 152 was wound, for example, with filament-like tungsten in the manner of a coil. At the start of operation, due to the asperities effect of the surface, the coil part acts as a basis for start-up (start position for start-up), and after operation, due to the asperities effect of the surface and due to the heat capacity, moreover, has the function of heat radiation. Since the coil is a thin wire, its temperature rises quickly; this facilitates the transition from a glow discharge to an arc discharge.

The tip area 151 with an increased diameter is located between the coil part 152 and the projection 154 in this embodiment. Tungsten vaporizes at this location. The tip area 151 with an increased diameter is formed by winding the support rod with a tungsten coil and either heating the coil or melting it by laser irradiation. From the coil with which the support rod 153 has been wound, therefore, the completely molten part becomes a tip area 151 with an increased diameter, while the unmelted part becomes the coil part 152. The tip area 151 with an increased diameter and the coil part 152 are integral with one another.

The tip area 151 with an increased diameter, as described above, was formed by melting the coil. As is shown in FIG. 3(a), however, the coil, the tip area with an increased diameter and the support rod cannot always be completely distinguished from one another. In this case, the part in which the cross sectional shape is essentially maintained as a coil is called the coil part, while in the case in which at least half the cross sectional shape of the coil is melted it is called the tip area 151 with an increased diameter.

In FIG. 3(b), the tip area 151 with an increased diameter is formed beforehand by cutting to length. Afterwards the back end is wound with a coil, by which the coil part 152 is formed. In this electrode, the tip area 151 with an increased diameter and the coil part are not formed integrally with one another, but are combined with one another. The shape of the tip area 151 with an increased diameter is not limited to the shape shown in FIG. 3(b), but can also be spherical according to FIG. 3(a). In this case, the tip area 151 with an increased diameter is located in the region which is identified by crosshatching in FIG. 3(b) and which is thicker than the support rod 153. In accordance with the invention, the "tip area 151 with an increased diameter" is defined as the location at which tungsten vaporizes and which contributes to production and growth of the projection 154.

In FIG. 3(c), the outside diameter of the tip area 151 with an increased diameter extends in the shape of a rod essentially unchanged. As in FIG. 3(b) the coil part 152 is formed in the tip area 151 with an increased diameter. In this case, the tip area 151 with an increased diameter, as is shown in FIG. 3(c) using crosshatching, has a thicker region than the support rod 153.

In FIG. 3(d), the tip area 151 with an increased diameter on the side of the support rod 153 is formed to be large and on the side of the projection 154 to be small. The side of the projection 154 is wound with the coil part 152. In this case, the tip area 151 with an increased diameter, as is shown in FIG. 3(c) using crosshatching constitutes a thicker region than the support rod 153.

With respect to operation during start-up, the function of heat radiation in steady-state operation and the like, the coil part can be used for any electrode if no disadvantage occurs, without being limited to melting electrodes and cut electrodes. Furthermore, there are also electrodes without coil parts.

For the electrode shown in FIG. 3(a), for example:

the maximum outside diameter of the tip area 151 with an increased diameter is roughly 0.5 mm to 1.8 mm, for example, 1.7 mm;

the length in the axial direction is roughly 0.7 mm to 3.5 mm, for example, 1 mm;

the outside diameter of the coil part is roughly 0.5 mm to 1.8 mm, for example, 1.7 mm;

the length in the axial direction is roughly 0.6 mm to 3.0 mm, for example, 0.8 mm;

the outside diameter of the axis 153 is roughly 0.3 mm to 0.8 mm, for example, 0.5 mm;

the length in the axial direction is roughly 3 mm to 8 mm, for example, 5 mm; and the outside diameter of the projection 154 is 0.2 mm to 0.7 mm, for example, 0.4 mm.

The invention is characterized in that, in the case of installing a discharge lamp 10 in the reflector 20, the volume of the tip area of the electrode 15a with an increased diameter on the side of the front opening of the reflector 20 is fixed in conjunction with the current value because it has been found that this irradiation has no effect on the disappearance of the projection by this fixing of the radiant light of the discharge lamp itself when the electrode 15a is irradiated with light reflected from the color wheel.

Specifically, it is advantageous that the relation between the volume W(mm$^3$) of the tip area 151 with an increased diameter and the operating current value I(A), i.e., W/(I$^2$) is selected from the range from 0.06 to 0.96. It is more advantageous if $W/(I^2)$ is selected from the range from 0.12 to 0.7. The reason for this is described using the experiment described below.

The reason why the volume of the tip area 151 with an increased diameter is called a factor in this connection is that the tip area 151 with an increased diameter is the main part of the electrode 15a and increasing the temperature causes vaporization of the tungsten. Therefore, the aforementioned reason also lies in that it can be said that the tip area 151 with an increased diameter influences the disappearance of the projection by the reflection light from the color wheel. Furthermore, the reason why the operating current value is called a factor is that the energy of the radiant lamp light is linked to the square of the current value.

The reason for fixing the volume of the tip area of the electrode 15a with an increased diameter on the side of the forward opening of the reflector 20 is that the reflection light from the color wheel is radiated onto the electrode 15a because the color wheel is somewhat closer to the discharge lamp than the focal position of the reflector. Therefore, it is advantageous that the electrode 15b on the side of the part of the reflector 20 opposite the opening has a smaller volume than the electrode 15a on the side of the front opening, because fixing the volume under the condition under which irradiation with light reflected from the color wheel is not received is desirable for advantageous production and advantageous growth of the projection.

However, since both the volume of the tip area of the electrode 15a with an increased diameter on the side of the front opening and also the volume of the tip area of the electrode 15b with an increased diameter on the side of the part of the reflector 20 opposite the opening, as volume values for which a projection is not produced, or as volume values for which with respect to formation of flicker no disadvantage for the projector device occurs, up to a certain degree have a range of numerical values, there can also be a case in which even at the same volume value of the two electrodes no disadvantage occurs.

The numerical values are named by way of example below.

In the case of a rated wattage of 200 W of the discharge lamp, the volume of the tip area of the electrode 15a with an increased diameter is 0.8 mm³ to 3 mm³, and in the case of a rated wattage of 250 W of the discharge lamp, the volume of the tip area of the electrode 15a with an increased diameter is 1.2 mm³ to 4 mm³.

Figure 4:
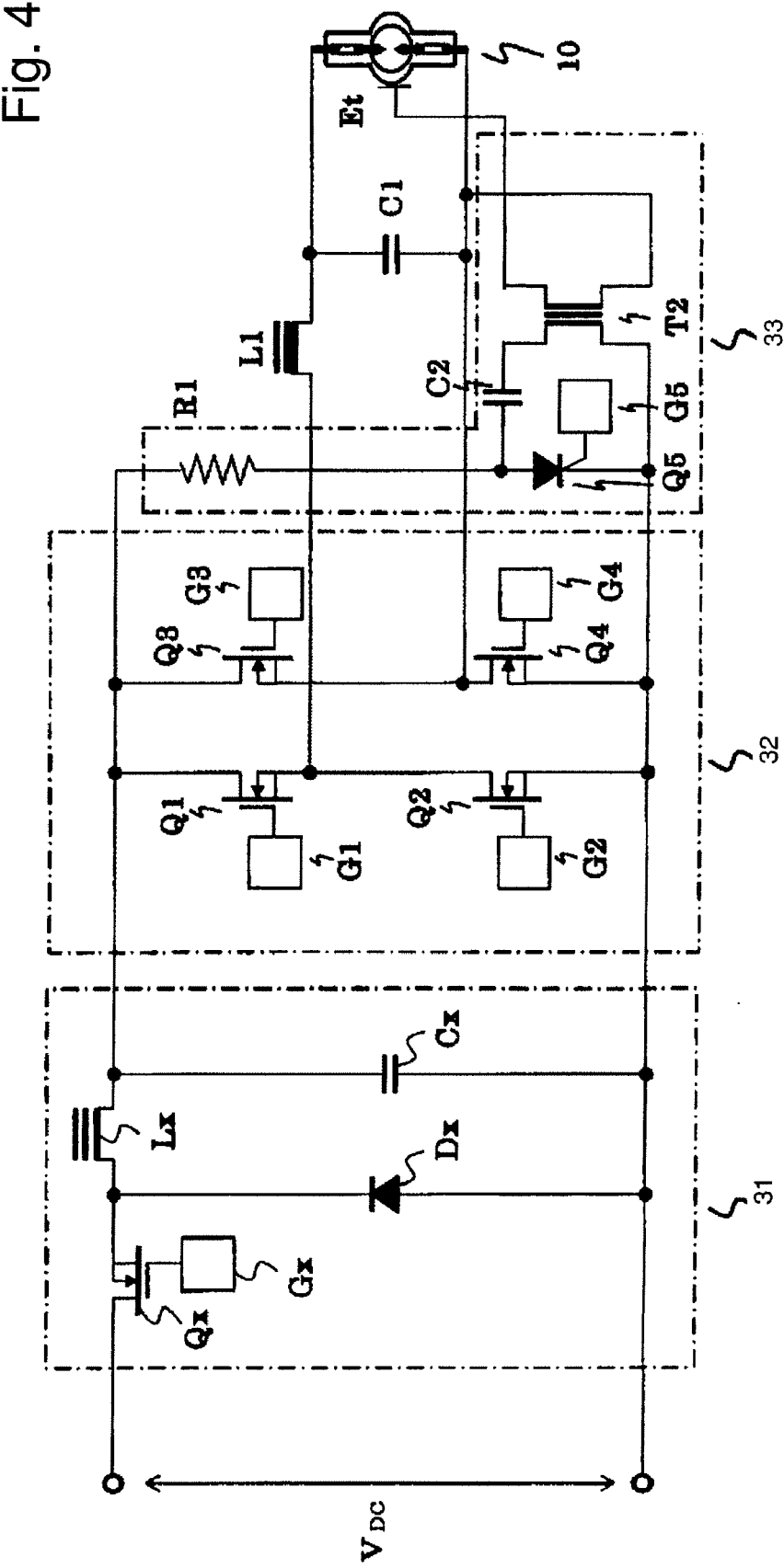
FIG. 4 is a circuit diagram of the arrangement of the feed device in accordance with the invention.

FIG. 4 shows a feed device for operating the above described discharge lamp.

The operating device is comprised of the discharge lamp 10 and the feed device 30. The feed device 30 is comprised of a voltage reduction chopper circuit 31 which is supplied with a DC voltage, an inverter circuit of the full bridge type 32 (hereinafter also called a full bridge circuit) which is connected to the output side of the voltage reduction chopper circuit 31 which changes the DC voltage into an AC voltage and supplies it to the discharge lamp 10, a coil L1 which is series-connected to the discharge lamp, a capacitor C1, and a starter circuit 33. The feed device 30, which together with the discharge lamp 10 is called an operation device, is formed from the voltage reduction chopper circuit 31, the full bridge circuit 32 and the starter circuit 33.

The voltage reduction chopper circuit 31 is connected to a DC source $V_{DC}$ and is comprised of a switching device Qx, a diode Dx, a coil Lx, a smoothing capacitor Cx and a driver circuit Gx of the switching device Qx. The switching device Qx is subjected to on/off driving by the driver circuit Gx. The pulse duty factor of the switching device Qx is controlled by this driving. Thus, the current or the wattage which is supplied to this discharge lamp 10 is controlled.

The full bridge circuit 32 is comprised of switching devices Q1 to Q4, such as a transistor or a FET which are connected in the manner of a bridge, and of driver circuits G1 to G4 of the switching devices Q1 to Q4. There are also cases in which diodes are connected anti-parallel to each of the switching devices Q1 to Q4. However, the diodes are omitted in this embodiment.

The above described switching devices Q1 to Q4 are driven via a control unit (not shown) by the driver circuit G1 to G4.

The switching devices Q1, Q4 and switching devices Q2, Q3 are repeatedly turned on and off in alternation to operate the full bridge circuit 32. When the switching devices Q1, Q4 are turned on, current flows in the path: voltage reduction chopper circuit 31→switching device Q1→coil L1→discharge lamp 10→switching device Q4→voltage reduction chopper circuit 31. On the other hand, when the switching devices Q2, Q3 are turned off, an alternating current with a rectangular waveform is supplied to the discharge lamp 10 in the line path: voltage reduction chopper circuit 31→switching device Q3→discharge lamp 10→coil L1→switching device Q2→voltage reduction chopper circuit 31.

When the above described switching devices Q1 to Q4 are operated, to prevent simultaneously turning on the switching devices Q1 to Q4, there is a time (dead time Td) when the polarity of the rectangular waveform is reversed, in which all of the switching devices Q1 to Q4 are turned off.

The frequency of the AC output supplied to the discharge lamp 10 with a rectangular waveform is selected from the range from 60 Hz to 1000 Hz (steady-state frequency) and is, for example, 200 Hz. The above described dead time is selected from a range from 0.5 ms to 10 ms.

Depending on the feed device, it is advantageous to regularly insert a lower frequency than this steady-state frequency by operating the discharge lamp with a steady-state frequency (60 Hz to 1000 Hz) since inserting a lower frequency leads to heating of the electrode, and as a result, can contribute to stable growth of the projection. The lower frequency has a length of a half period up to five periods and is inserted with intervals of 0.1 second to 120 seconds.

FIG. 5 contains test results which show the action of the invention. In a test in the light source device shown in FIG. 1, the state of the projection of the electrode tip is observed in the course of discharge lamp operation. Specifically, the probability of the presence of a projection of the electrode on the side of the front opening of the reflector after 30 minutes of operation, control of the illuminance on the screen after 30 minutes of operation and the positional stability in the case of the presence of a projection are observed.

As shown in FIG. 2, 20 discharge lamps (in FIG. 5, lamps 1 to 20) with altered volumes of the tip area with an increased diameter using the melting electrodes shown in FIG. 3(a) were utilized. By changing the current value for these 20 lamps, a value of $W/(I^2)$ in the range of 0.02 to 1.04 was changed and the above described properties were observed.

In the lamps used for the test, the maximum outside diameter of the silica glass arc tube was 10.0 mm and the light emitting part contained 0.25 mg/mm³ mercury, $10^{-4}$ μmol/mm³ bromine gas and rare gas. In this connection, the distance between the electrodes was 1.0 mm. The lamps were operated at an input power in the range from 200 W to 230 W using an AC current. The reflector was an oval reflector with a front opening of 46 mm².

FIG. 5 shows the respective value of $W/(I^2)$ of lamps 1 to 20, the probability of the presence of a projection, control of illuminance and positional stability of the projection. Each lamp was observed roughly 5 to 10 times each (the frequency of observation differs depending on the lamp). The probability of the presence of a projection is represented in % by the frequency of observation (number of presences compared to number of samples).

The illuminance was visually controlled. Each lamp was evaluated as follows, one level at a time being shown with ⌈⊕⌋, ⌈o⌋, ⌈Δ⌋, ⌈x⌋:

⊕⌋: no fluctuation of illuminance at all is found.
°⊕⌋: fluctuation of illuminance is essentially negligible.
^⊕⌋: extremely low fluctuation of illuminance, but altogether is essentially negligible.
⌈x⌋: fluctuation of illuminance observed to the degree which is visually perceived as unpleasant.

For positioning stability the position of the projection after 30 minutes of operation was observed.

⌈⊕⌋ a case of symmetrical formation around the electrode axis (see FIG. 3(a));
⌈o⌋ a case of formation of an extremely large part of the projection on the electrode axis;
⌈Δ⌋ a case of formation of part of the projection on the electrode axis; and
⌈x⌋ a case of deviation of the projection from the electrode axis.

It becomes apparent from the test results as shown in FIG. 5 that, in the case of a value of $W/(I^2)$ smaller than 0.04 the probability of the presence of the projection is 65%, therefore is low, and that in the case of 0.02 a projection was hardly observed. In the case in which the value $W/(I^2)$ is smaller than 0.04 there is hardly any projection on the electrode tip. In this connection, the so-called arc jump phenomenon was repeatedly established, by which the fluctuation of illuminance arose to a degree which cannot be allowed for a video device. In the case of a value of $W/(I^2)$ larger than 1.0 on the electrode tip there is a projection, the projection however not being present at a suitable location; this as a consequence causes fluctuation of the illuminance. It can be imagined that the reason for this is the following:

The volume of the tip area with an increased diameter becomes unduly large, so that a location which is irradiated with the reflection light from the color wheel and a location which is not irradiated with it distinctly arise. As a result, in the tip area with an increased diameter, an unbalanced temperature distribution forms so that tungsten vaporizes at an extremely undesirable location. The subsequent growth of the projection takes place therefore at an unwanted location.

In particular, in the range from 0.1 to 0.7 of the value of $W/(I2)$ the probability of the presence of the projection is high. The fluctuation of the illuminance and the positional stability of the projection are good in this case. Furthermore, it becomes apparent that the probability of the presence of a projection in the case of 0.12 to 0.7 of the value $W/(I^2)$ is 100%, therefore is extremely good.

In this test, the color wheel is not inclined, but is arranged such that the light radiated from the discharge lamp is projected normal to it. However, the inventors have confirmed by a subsequent test that, in the case of an inclination of the color wheel of roughly 5°, in practice, the reflection light returns to the discharge lamp. Therefore, in accordance with the invention numerical values are fixed such that, in the case of an inclination of the color wheel of at least by 0° to 5°, the projection itself does not disappear by irradiation with the reflection light from the color wheel. In the case of an inclination of the color wheel of 5° or more, the light reflected from the color wheel returns not only to the discharge lamp, but is reflected in another direction. In this connection, the electrode temperature does not rise. However, there is the disadvantage that the optical system is made large.

As was described above, in accordance with the invention, the parameters which are determined by the electrode (tip area with an increased diameter) and the current value are subjected to fixing of the numerical value with consideration of the light returning from the color wheel. In this way, a lamp can be operated without disappearance of the projection even for irradiation with above described returned light, i.e., without formation of an arc jump during operation and without formation of instability of the illuminance.

What we claim is:

1. Light source device, comprising:
   an ultrahigh pressure discharge lamp with a silica glass discharge vessel that contains a pair of opposed electrodes spaced from each other by a distance of at most 1.5 mm, and which is filled with at least 0.15 mg/mm$^3$ of mercury and bromine within a range from 10$^{-6}$ μmol/mm$^3$ to 10$^{-2}$ μmol/mm$^3$;
   a feed device which supplies an alternating current to the discharge lamp and operates it;
   an oval reflector which is located such that its optical axis coincides with a direction of an electrode axis of the discharge lamp and which reflects radiant light of the discharge lamp out of a front opening of the reflector; and
   a color wheel which proceeding from a focal position of the oval reflector is located at the position nearer the lamp and which receives the light from the reflector and divides it into color components,
   wherein each of the electrodes has an enlarged tip area with a diameter larger than a diameter of a support rod which bears the electrode and a coil part adjoining the enlarged tip area of the electrode,
   wherein for a one of the electrodes which is located on a side of the front opening of the reflector, the tip area with increased diameter has a volume W (mm$^3$) which is related to the current supplied from the feed device in accordance with the relationship $0.06 < W/I^2 < 0.96$, and
   wherein the volume of the enlarged tip area of the electrode on the side of the reflector opposite the front opening is smaller than the volume of the enlarged tip area of the electrode on the side of the front opening of the reflector.

* * * * *